United States Patent

Mayer-Mader et al.

[11] 3,878,181
[45] Apr. 15, 1975

[54] EMULSION POLYMERISATION OF CHLOROPRENE WITH DIETHYLHYDROXY-AMINES AS INACTIVATOR

[75] Inventors: Rudolf Mayer-Mader, Cologne-Buchheim; Gerhard Hohmann, Leverkusen, both of Germany

[73] Assignee: Bayer Aktiengesellschaft, Leverkusen, Germany

[22] Filed: Jan. 7, 1974

[21] Appl. No.: 431,345

[30]     Foreign Application Priority Data
Jan. 11, 1973   Germany............................ 2301158

[52] U.S. Cl....... 260/92.3; 260/79.5 C; 260/85.5 N; 260/86.3

[51] Int. Cl............................ C08d 3/14; C08f 3/20
[58] Field of Search......................... 260/92.3, 666.5

[56]            References Cited
         UNITED STATES PATENTS
2,576,009   11/1951   Goertz............................... 260/92.3
3,222,334   12/1965   Demme.............................. 260/92.3

Primary Examiner—Joseph L. Schofer
Assistant Examiner—Herbert J. Lilling
Attorney, Agent, or Firm—Connolly and Hutz

[57]              ABSTRACT

A process for terminating the polymerisation of chloroprene and/or 2,3-dichlorobutadiene in which diethylhydroxylamine is added to the polymerisation mixture in an amount sufficient to stop polymerisation.

2 Claims, No Drawings

EMULSION POLYMERISATION OF CHLOROPRENE WITH DIETHYLHYDROXY-AMINES AS INACTIVATOR

Emulsion polymerization of chloroprene and/or 2,3-dichlorobutadiene has been known for a long time. Polymers produced at a low polymerisation temperature are generally used as adhesives and polymers produced at high polymerisation temperatures are used as rubbers. The molecular weight of the polymer prepared by this method of polymerization can be adjusted with mercaptans (see British Patent No. 1,048,235) or with alkyl xanthate disulphides (see British Patent No. 512,458). Polymerization may also be carried out without a molecular weight modifier if sulphur is added during polymerisation and the resulting copolymer containing sulphur is subsequently degraded with a peptising agent to reduce its viscosity (see German Offenlegungsschrift No. 2,003,147).

To obtain polymers with optimum properties for practical purposes, polymerization must be terminated at a monomer conversion of less than about 80 percent because at higher conversion cross-linked products will be obtained. Polymerization can be terminated by, for example, removing any unreacted monomers from the reaction mixture by steam distillation, but as this "degasification" takes some time, polymerisation is not terminated instantly so that the conversion rate cannot be accurately controlled.

Polymerization is therefore generally terminated by adding substances which inhibit polymerization and inactivate the polymerisation catalyst. Such substances will hereinafter be referred to as stopping agents. The following are examples: phenothiazone and tert.-butyl pyrocatechol (see U.S. Patent No. 2,576,009). These stopping agents, however, cause discoloration of the polymer, especially on exposure to light. Other stopping agents are: nitroxides (see British Patent No. 1,124,009), salts of nitric acid (see British Patent No. 900,970), nitrogen monoxide (see Dutch Offenlegungsschrift No. 6,615,549) and oxalates (see Belgian Patent No. 612,246). All these stopping agents are only very slightly effective.

This invention is based on the discovery that diethyl hydroxylamine reliably terminates the emulsion polymerization of chloroprene and/or 2,3-dichlorobutadiene. The polymers treated with this agent are very light in colour and do not dicolour even when exposed to light or heat. This particularly pronounced when xanthate disulphides are used as molecular weight modifiers. The effect of diethyl hydroxylamine can be enhanced by simultaneously adding water soluble amines.

The stopping agents hitherto known are either too weak or they discolour the polymer or adversely affect its processing properties. Thus for example bromination of poly-2,3-dichlorobutadiene becomes very difficult if phenothiazine is used as stopping agent in the preparation of the polymer. The induction period is increased and substitution of the hydrogen atom positioned at the alkyl group is prevented.

This invention relates to a process for terminating the emulsion polymerization of chloroprene and/or 2,3-dichlorobutadiene which comprises adding to the polymerisation mixture 0.05 to 5 parts by weight of diethylhydroxylamine and optionally 0.05 to 5 parts by weight of a water soluble amine per 100 parts by weight of originally present chloroprene and/or 2,3-dichlorobutadiene at a monomer conversion of 40 to 80 percent by weight.

Emulsion polymerisation to produce chloroprene homopolymers and copolymers of 2,3-dichlorobutadiene polymers is known per se. Any of the usual emulsifiers may be used, e.g. water soluble salts, in particular alkali metal salts of long chain fatty acids, resinic acids, disproportioned abietic acids, aryl sulphonic acids and their formaldehyde condensation products, alkyl and aryl sulphonates or sulphates and ethoxylated alcohols or phenols.

The initiators used for polymerisation are the usual radical forming catalysts, e.g. hydrogen peroxide, cumene hydroperoxide, water soluble salts of peroxydisulphuric acid, 2,2'-azo-bis-isobutyronitrile, salts of formamidine sulphinic acid and combinations of potassium persulphate and $\beta$-anthraquinone sulphonic acid.

As a general rule, the aqueous solution of catalyst is added to an aqueous emulsion which contains the monomers and emulsifying agents. Polymerization is generally carried out at pH 7–13 and at temperatures of from 0° to 60°C and the monomer content of the emulsion is adjusted to 30–60 percent by weight of the whole emulsion.

The polymer can be adjusted to a particular molecular weight by carrying out polymerisation in the presence of modifiers such as mercaptans or dialkylxanthate disulphides.

The following are ethylenically unsaturated comonomers which can be copolymerised with chloroprene: acrylonitrile, methacrylonitrile, $\alpha$-chloroacrylonitrile, and ethyl acrylate.

The process according to the invention may generally be carried out as follows:

At the desired monomer conversion an approximately 2.5 percent solution of diethylhydroxylamine in water is added to the polymerisation mixture and the mixture is cooled to 15°C. The residual monomers are then removed from the dispersion. The polymer is then isolated from the dispersion in known manner.

Diethylhydroxylamine is a known compound. It may be prepared, for example, by the method described in Journal American Chemical Society 79 (1957) page 964. Water soluble amines suitable for the process are particularly those of the formula $NR_3$ in which R may be identical or different and denotes hydroxyalkyl groups or alkyl groups containing 1 to 10 carbon atoms, at least two of the Rs denoting hydroxyalkyl groups. The following are examples: triethanolamine, N-methyl-di-(isopropanol-amine and tri-(isopropanol)amine.

POLYMERISATION EXAMPLES

EXAMPLE 1

The polymer is produced by polymerising the following mixture:

| | parts by weight |
|---|---|
| chloroprene | 100 |
| diethylxanthate disulphide | 0.4 |
| deionised water | 120 |
| sodium salt of a disproportionated abietic acid | 4.5 |
| sodium salt of the condensation product of naphthalene sulphonic acid and formaldehyde | 0.7 |
| caustic soda | 0.4 |
| tetrasodium pyrophosphate | 0.5 |

Polymerisation is started at 45°C with a mixture of formamidine sulphinic acid and deionised water.

When 65–70 percent by weight of the monomers have been polymerised, the latex is divided up into several portions. To Portion A are added 0.05 parts by weight of phenothiazine, to Portion B 0.05 parts by weight of tert.-butyl pyrocatechol (TBC), to portion C a combination of 0.025 parts by weight of phenothiazine and 0.025 parts by weight of tertiary-butyl pyrocatechol in 2 parts by weight of toluene, to Portion D 0.05 parts by weight of diethylhydroxylamine in 2 parts by weight of water, and to portion E 0.05 parts by weight of diethylhydroxylamine and 0.01 parts by weight of triethanolamine.

Table I shows that all the products have an efficient stopping action, especially if the latex is subsequently cooled to 15°C.

Table I

| Sample | stopping agents used | % conversion at the end of polymerisation | % conversion after 1 hour at 15°C | % conversion after 5 hours at 15°C | colour of the polymer |
|---|---|---|---|---|---|
| IA | 0.05% phenothiazine | 65 | 66.2 | 67.5 | discoloured grey brown |
| IB | 0.05% TBC | 65 | 66.3 | 67.3 | discoloured grey brown |
| IC | 0.025% TBC 0.025% phenothiazine | 65 | 66.0 | 67.0 | discoloured grey brown |
| ID | 0.05% diethyl hydroxylamine | 65 | 66.3 | 67.3 | clear |
| IE | 0.05% diethyl hydroxylamine 0.01% triethanolamine | 65 | 66.3 | 67.3 | clear |

After removal of the remaining monomer, the latex is worked up in the usual manner and dried in a vacuum at 70°C for 48 hours. Table I shows that products D and E which were stopped with diethylhydroxylamine are light in colour.

EXAMPLE 2

The polymer is produced by polymerising the following mixture:

| | parts by weight |
|---|---|
| chloroprene | 100 |
| n-dodecyl mercaptan | 0.28 |
| deionised water | 120 |
| sodium salt of a disproportionated abietic acid | 5 |
| sodium salt of the condensation product of naphthalene sulphonic acid and formaldehyde | 0.5 |
| caustic soda | 0.5 |
| tetrasodium pyrophosphate | 0.5 |

Polymerisation is started at 45°C with a mixture of formamidine sulphuric acid and deionised water. When 65–70 percent of the monomer has been polymerised, various combinations of stopping agents are added to the latex as in Example 1 and the increase in percentage conversion to polymer is followed (Table II).

Table II

| Sample | stopping agents used | % conversion at the end of polymerisation | % conversion after 1 h at 15°C | % conversion after 5 h at 15°C | colour of the polymer |
|---|---|---|---|---|---|
| II A | 0.05% phenothiazine | 67 | 68 | 68.8 | discoloured grey brown |
| II B | 0.05% tert.-butyl pyrocatechol | 67 | 68.2 | 69.0 | " |
| II C | 0.025% phenothiazine + 0.025% TBC | 67 | 67.8 | 68.5 | " |
| II D | 0.05% diethylhydroxylamine | 67 | 68 | 68.4 | clear |
| II E | 0.05% diethylhydroxylamine + 0.01% triethanolamine | 67 | 68.1 | 68.3 | clear |

EXAMPLE 3

The polymer is produced by polymerising the following mixture:

| | parts by weight |
|---|---|
| chloroprene | 100 |
| sulphur | 0.65 |
| deionised water | 120 |
| sodium salt of a disproportionated abietic acid | 5 |
| sodium salt of the condensation product of naphthalene sulphonic acid and formaldehyde | 0.5 |
| caustic soda | 0.5 |
| tetrasodium pyrophosphate | 0.5 |

Polymerisation is started at 45°C with a mixture of potassium peroxidisulphate and anthraquinone-β-sulphonic acid.

When 65–70 percent of the monomer has been converted to polymer, various combinations of stopping agents are added to the latex as in Example 1 and the increase in conversion is followed (Table III).

Table III

| Sample | stopping agents used | % conversion at the end of polymerisation | % conversion after 1 h at 15°C | % conversion after 5 h at 15°C | colour of the polymer |
|---|---|---|---|---|---|
| III A | 0.05% phenothiazine | 66.8 | 67 | 68.2 | discoloured grey brown |
| III B | 0.05% TBC | 66.8 | 67.2 | 68.3 | " |
| III C | 0.025% phenothiazine + 0.025% TBC | 66.8 | 67 | 68.2 | " |
| III D | 0.05% diethylhydroxylamine | 66.8 | 67.1 | 67.9 | clear |
| III E | 0.05% diethylhydroxylamine + 0.01% triethanolamine | 66.8 | 67 | 68.0 | clear |

EXAMPLE 4

The polymer was produced by polymerising the following mixture:

| | parts by weight |
|---|---|
| chloroprene | 100 |
| sulphur | 0.35 |
| diethylxanthate disulphide | 0.35 |
| deionised water | 120 |
| sodium salt of a disproportionated abietic acid | 5 |
| sodium salt of the condensation product of naphthalene sulphonic acid and formaldehyde | 0.5 |
| caustic soda | 0.5 |
| tetrasodium pyrophosphate | 0.5 |

Polymerisation is started at 45°C with a mixture of potassium peroxidisulphate and anthraquinone-β-sulphonic acid. When 65–70 percent of the monomer has been converted to polymer, various combinations of stopping agents are added to the latex as in Example 1 and the increase in conversion is followed (Table IV).

Table IV

| Sample | stopping agents used | % conversion at the end of polymerisation | % conversion after 1 hour at 15°C | % conversion after 5 hours at 15°C | colour of the polymer |
|---|---|---|---|---|---|
| IV A | 0.05% phenothiazine | 64.8 | 65.7 | 67.1 | discoloured grey brown |
| IV B | 0.05% TBC | 64.8 | 65.9 | 67 | " |
| IV C | 0.025% phenothiazine + 0.025% TBC | 64.8 | 65.6 | 66.8 | " |
| IV D | 0.05% diethylhydroxylamine | 64.8 | 66.1 | 66.7 | clear |
| IV E | 0.05% diethyl hydroxylamine + 0.01% triethanolamine | 64.8 | 65.9 | 66.9 | " |

EXAMPLE 5

The polymer was produced by polymerising the following mixture:

| | parts by weight |
|---|---|
| chloroprene | 95 |
| sulphur | 0.35 |
| 2,3-dichlorobutadiene-(1,3) | 5 |
| diethylxanthate disulphide | 0.4 |
| deionised water | 120 |
| sodium salt of a disproportionated abietic acid | 5 |
| sodium salt of the condensation product of naphthalene sulphonic acid and formaldehyde | 0.5 |
| caustic soda | 0.5 |
| tetrasodium pyrophosphate | 0.5 |

Polymerisation is started at 45°C with a mixture of potassium peroxidisulphate and anthraquinone-β-sulphonic acid.

When 65–70 percent of the monomer has been converted to polymer, various combinations of stopping agents are added to the latex as in Example 1 and the increase in conversion is followed (Table V).

Table V

| Sample | stopping agents used | % conversion at the end of polymerisation | % conversion after 1 h at 15°C | % conversion after 5 h at 15°C | colour of the polymer |
|---|---|---|---|---|---|
| V A | 0.05% phenothiazine | 65.3 | 66.2 | 67.2 | discoloured grey brown |
| V B | 0.05% TBC | 65.3 | 66.5 | 67.3 | " |
| V C | 0.025% phenothiazine 0.05% TBC | 65.3 | 66.0 | 67.0 | " |
| V D | 0.05% diethyl hydroxylamine | 65.3 | 66.3 | 67.1 | clear |
| V E | 0.05% diethylhydroxylamine 0.01% triethanolamine | 65.3 | 66.5 | 67.2 | " |

EXAMPLE 6

The polymer is produced by polymerising the following mixture:

| | parts by weight |
|---|---|
| chloroprene | 100 |
| n-dodecylmercaptan | 0.16 |
| deionised water | 120 |
| sodium salt of a disproportionated abietic acid | 5 |
| sodium salt of the condensation product of naphthalene sulphonic acid and formaldehyde | 0.5 |
| caustic soda | 0.5 |
| tetrasodium pyrophosphate | 0.5 |

Polymerisation is started at 10°C with a mixture of formamidine sulphonic acid in deionised water.

When 65–70 percent of the monomer has been converted to polymer, various combinations of stopping agents are added to the latex as in Example 1.

Table VI

| Sample | stopping agents used | % conversion at the end of polymerisation | % conversion after 1 h at 10°C | % conversion after 5 h at 10°C | colour of the polymer |
|---|---|---|---|---|---|
| VI A | 0.05% phenothiazine | 67 | 67.8 | 68.7 | discoloured grey brown |
| VI B | 0.05% TBC | 67 | 67.9 | 68.9 | " |
| VI C | 0.025% phenothiazine 0.025% TBC | 67 | 67.8 | 68.5 | " |
| VI D | 0.05% diethylhydroxylamine | 67 | 67.9 | 68.6 | clear |
| VI E | 0.05% diethylhdroxylamine 0.01% triethanolamine | 67 | 67.9 | 68.7 | clear |

EXAMPLE 7

The polymer is produced by polymerising the following mixture:

|                                                                                      | parts by weight |
|--------------------------------------------------------------------------------------|-----------------|
| 2,3-dichlorobutadiene-(1,3)                                                          | 100             |
| n-dodecylmercaptan                                                                   | 8               |
| deionised water                                                                      | 120             |
| sodium salt of a disproportionated abietic acid                                      | 5               |
| sodium salt of the condensation product of naphthalene sulphonic acid and formaldehyde | 0.5             |
| caustic soda                                                                         | 0.5             |
| tetrasodium pyrophosphate                                                            | 0.5             |

Polymerisation is started at 45°C with a mixture of formamidine sulphonic acid and deionised water.

When 95 percent of the monomer has been converted to polymer, various combinations of stopping agents are added to the latex as in Example 1. The polymer, after having been isolated, is brominated, and the incubation time is determined. Bromination is caried out as described in U.S. Patent Specification No. 2,725,373.

12.3 g of poly-dichlorobutadiene are introduced into a three-necked flask which already contains 150 ml of tetrachloromethane. The flask is then rinsed with nitrogen and the mixture is boiled under reflex with stirring until a clear solution is obtained. Two solutions are then added dropwise, one consisting of 7.25 g of bromine dissolved in 20 ml of CCl₄ and the other of 0.56 g of tert.-butyl-hydroperoxide in 5 ml of CCl₄. The time required before evolution of hydrogen bromine sets in (induction period) is shown in Table VII.

The time before allyl bromination sets in various according to the stabilizer used (induction period).

Table VII

| System of stopping agents | | induction period (min.) |
|---|---|---|
| A | Phenothiazine | >120 |
| B | tert.-butyl pyrocatechol | >120 |
| C | phenothiazine/tert.Obutyl pyrocatechol | >80 |
| D | diethylhydroxylamine | 0 – 2 |
| E | diethylhydroxylamine + triethanolamine | 0 – 2 |

It can be seen from Table VII that the induction period up to the onset of evolution of HBr in accordance with the following reaction scheme:

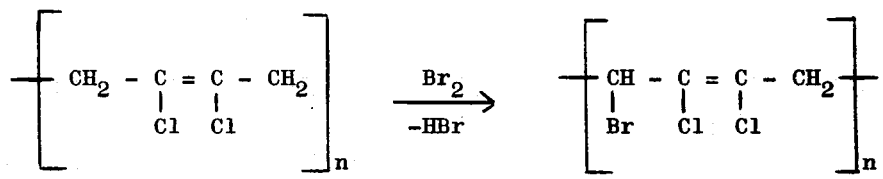

is not increased if polymerisation is stopped with diethylhydroxylamine but is particularly increased when phenothiazine is used.

What is claimed is:

1. A process for terminating the aqueous emulsion polymerisation of 2,3-dichlorobutadiene which comprises adding to the polymerisation mixture when the monomer conversion reaches 40–80 percent by weight, 0.05 to 5 parts by weight of diethylhydroxylamine per 100 parts by weight of 2,3-dichlorobutadiene and 0.05 to 5 parts by weight of a water-soluble amine, per 100 parts by weight of 2,3-dichlorobutadiene, said water soluble amine being of the formula NR₃ wherein two of the R groups are hydroxyalkyl having 1 to 10 carbon atoms and the third R group is selected from the group consisting of hydroxyl and alkyl having 1 to 10 carbon atoms.

2. The process of claim 1 wherein NR₃ is triethanolamine.

* * * * *